United States Patent
Hong

(10) Patent No.: US 11,956,824 B2
(45) Date of Patent: Apr. 9, 2024

(54) METHODS AND DEVICES FOR ACCESS CONTROL, USER EQUIPMENT AND BASE STATIONS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 365 days.

(21) Appl. No.: 17/593,998

(22) PCT Filed: Apr. 1, 2019

(86) PCT No.: PCT/CN2019/080795
§ 371 (c)(1),
(2) Date: Sep. 29, 2021

(87) PCT Pub. No.: WO2020/199073
PCT Pub. Date: Oct. 8, 2020

(65) Prior Publication Data
US 2022/0191932 A1 Jun. 16, 2022

(51) Int. Cl.
*H04W 74/0816* (2024.01)
*H04W 74/00* (2009.01)
*H04W 74/0833* (2024.01)

(52) U.S. Cl.
CPC ..... *H04W 74/0816* (2013.01); *H04W 74/008* (2013.01); *H04W 74/0841* (2013.01)

(58) Field of Classification Search
None
See application file for complete search history.

(56) References Cited

U.S. PATENT DOCUMENTS

2017/0006640 A1* 1/2017 Dinan ............... H04W 74/0833
2018/0227911 A1* 8/2018 Belghoul ............. H04L 1/1854
(Continued)

FOREIGN PATENT DOCUMENTS

CN 107371168 A 11/2017
CN 107734706 A 2/2018
(Continued)

OTHER PUBLICATIONS

ISA State Intellectual Property Office of the People's Republic of China, International Search Report Issued in Application No. PCT/CN2019/080795, dated Jul. 1, 2019, WIPO, 4 pages.
State Intellectual Property Office of the People's Republic of China, Office Action and Search Report Issued in Application No. 201980000574X, dated Dec. 14, 2021, 13 pages. (Submitted with Machine/Partial Translation).

(Continued)

Primary Examiner — Diane L Lo
(74) Attorney, Agent, or Firm — Syncoda LLC; Feng Ma

(57) ABSTRACT

A method for access control includes: determining a result of listen-before-talk (LBT) detection on a to-be-detected channel, wherein the to-be-detected channel is an unlicensed channel for sending a random access preamble; increasing a preamble transmission counter by one in response to that the result of the LBT detection indicates a failure, and determining a count value of the preamble counter; and performing radio link failure processing in response to that the count value of the preamble transmission counter reaches a maximum number of times for transmitting the preamble, wherein maximum number of times for transmitting the preamble and traffic type of a to-be-transmitted traffic have a correspondence, or service class identifier of a to-be-transmitted traffic have a correspondence.

19 Claims, 5 Drawing Sheets

(56) References Cited

U.S. PATENT DOCUMENTS

2020/0077446 A1* 3/2020 Agiwal ................ H04W 16/14
2021/0243808 A1* 8/2021 Deenoo ................. H04L 5/005
2022/0078873 A1* 3/2022 Belleschi ............. H04W 28/24

FOREIGN PATENT DOCUMENTS

| CN | 107770868 A | 3/2018 |
| CN | 108476532 A | 8/2018 |
| WO | 2016072908 A1 | 5/2016 |
| WO | 2017171999 A1 | 10/2017 |
| WO | 2018106429 A1 | 6/2018 |
| WO | 2019031796 A1 | 2/2019 |
| WO | 2019034101 A1 | 2/2019 |

OTHER PUBLICATIONS

ISA State Intellectual Property Office of the People's Republic of China, Written Opinion of the International Searching Authority Issued in Application No. PCT/CN2019/080795, dated Jul. 1, 2019, WIPO, 8 pages.

Session Chairman (Nokia), "Chairman's Notes of Agenda Item 8.1.4 Channel coding", 3GPP TSG RAN WG1 Meeting #88bis, R1-1706377, Spokane, USA, Apr. 3-7, 2017, 8 pages.

European Patent Office, Extended European Search Report Issued in Application No. 19923213.3, dated Oct. 20, 2022, Germany, 13 pages.

Ericsson, "Handling UL LBT failures", 3GPP TSG-RAN WG2 #105bis Tdoc, R2-1904747, Revision of R2-1901674, Xi'an, China, Apr. 8, 2012 Apr. 2019, 3 pages.

* cited by examiner

METHODS AND DEVICES FOR ACCESS CONTROL, USER EQUIPMENT AND BASE STATIONS

CROSS-REFERENCE TO RELATED APPLICATION

The present application is a national stage of International Application No. PCT/CN2019/080795 filed on Apr. 1, 2019, the disclosure of which is hereby incorporated by reference in its entirety.

TECHNICAL FIELD

The present disclosure relates to the field of communication technologies, and in particular, to a method and a device for access control, user equipment (UE) and a base station.

BACKGROUND

With the rapid development of wireless communication technology, most spectrum resources on a licensed spectrum are occupied by various communication systems. Therefore, in order to expand frequency resources, the wireless communication system expands working frequency bands to unlicensed frequency bands.

In order to expand the new radio (NR) technology of the fifth generation (5G) mobile communication technology to use unlicensed frequency bands, the third generation partnership project (3GPP) has adopted a study on preforming NR-based access to an unlicensed spectrum, so that the NR can meet the regulatory requirements of unlicensed frequency bands. Based on the conclusions of the study, user equipment supporting New Radio Access to Unlicensed spectrum (NR-U) is required to follow a channel competition access mechanism of Listen-Before-Talk (LBT) when performing access to the network. UE supporting NR-U may fail the LBT continuously due to fierce competition of unlicensed frequency band resources, which can reduce a random access success rate of the UE and affect a performance of the NR-U system. Therefore, in order to improve the performance of the NR-U system, it is necessary to propose a new random access scheme to improve the random access success rate of the UE supporting NR-U.

SUMMARY

In order to overcome the problems in the art, embodiments of the present disclosure provide a method and a device for access control, user equipment and a base station, in order to improve the access success rate of the user equipment supporting NR-U to perform random access when the competition for unlicensed band resources is fierce.

According to a first aspect of the embodiments of the present disclosure, a method of access control is provided, which is applied to user equipment supporting new radio access to an unlicensed spectrum, including:

determining a result of listen-before-talk (LBT) detection on a to-be-detected channel, wherein the to-be-detected channel is an unlicensed channel for sending a random access preamble;

increasing a preamble transmission counter by one in response to that the result of the LBT detection indicates a failure, and determining a count value of the preamble counter; and performing radio link failure processing in response to that the count value of the preamble transmission counter reaches a maximum number of times for transmitting the preamble, wherein maximum number of times for transmitting the preamble and traffic type of a to-be-transmitted traffic have a correspondence, or service class identifier of a to-be-transmitted traffic have a correspondence.

Optionally, the method further includes at least one of the following:

determining the correspondence between maximum number of time for transmitting the preamble and traffic type of the to-be-transmitted traffic based on a provision of a communication protocol; or determining the correspondence between maximum number of times for transmitting the preamble and quality of service class identifier of the to-be-transmitted traffic based on the provision of the communication protocol.

Optionally, the method further includes:

receiving a first system information block sent by a base station; and analyzing the correspondence between maximum number of times for transmitting the preamble and traffic type of the to-be-transmitted traffic from the first system information block, or analyzing the correspondence between maximum number of times for transmitting the preamble and quality of service class identifier of the to-be-transmitted traffic from the first system information block.

Optionally, the method further includes:

performing the determining the result of LBT detection on the to-be-detected channel in response to that the count value of the preamble transmission counter does not reach the maximum number of times for transmitting the preamble.

Optionally, the method further includes:

in response to that the result of the LBT detection indicates a success, sending the random access preamble to a base station.

According to a second aspect of the embodiments of the present disclosure, a method of access control is provided, which is applied to a base station supporting new radio access to an unlicensed spectrum, including:

determining a first system information block based on a supported traffic type, wherein the first system information block carries at least one of: a correspondence between traffic type and maximum number of times for transmitting a preamble or a correspondence between quality of service class identifier and maximum numbers of times for transmitting a preamble; and broadcasting the first system information block.

According to a third aspect of the embodiments of the present disclosure, a device for access control is provided, which is applied to user equipment supporting new radio access to an unlicensed spectrum, including:

a channel detection module configured to determine a result of listen-before-talk (LBT) detection on a to-be-detected channel, wherein the to-be-detected channel is an unlicensed channel for sending a random access preamble;

a counting module configured to increase a preamble transmission counter by one in response to that the result of the LBT detection indicates a failure, and determining a count value of the preamble counter; and a link failure processing module configured to perform radio link failure processing in response to that the count value of the preamble transmission counter reaches a maximum number of times for transmitting the preamble, wherein maximum number of times for transmitting the preamble and traffic type of a to-be-transmitted traffic have a correspondence, or service class identifier of a to-be-transmitted traffic have a correspondence.

Optionally, the device further includes:

a first determining module configured to determine the correspondence between maximum number of time for transmitting the preamble and traffic type of the to-be-transmitted traffic based on a provision of a communication protocol; or determine the correspondence between maximum number of times for transmitting the preamble and quality of service class identifier of the to-be-transmitted traffic based on the provision of the communication protocol.

Optionally, the device further includes:

a receiving module configured to receive a first system information block sent by a base station; and a parsing module configured to analyze the correspondence between maximum number of times for transmitting the preamble and traffic type of the to-be-transmitted traffic from the first system information block, or analyze the correspondence between maximum number of times for transmitting the preamble and quality of service class identifier of the to-be-transmitted traffic from the first system information block.

Optionally, wherein the channel detection module is further configured to perform the determining the result of LBT detection on the to-be-detected channel in response to that the count value of the preamble transmission counter does not reach the maximum number of times for transmitting the preamble.

Optionally, the device further includes:

a sending module configured to in response to that the result of the LBT detection indicates a success, send the random access preamble to a base station.

According to a fourth aspect of the embodiments of the present disclosure, a device for access control is provided, which is applied to a base station supporting new radio access to an unlicensed spectrum including:

a second determining module configured to determine a first system information block based on a supported traffic type, wherein the first system information block carries at least one of: a correspondence between traffic type and maximum number of times for transmitting a preamble or a correspondence between quality of service class identifier and maximum numbers of times for transmitting a preamble; and a broadcasting module configured to broadcast the first system information block determined by the second determining module.

According to a fifth aspect of the embodiments of the present disclosure, user equipment is provided, including:

a processor; and memory for storing processor executable instructions;

wherein the processor is configured to:

determine a result of listen-before-talk (LBT) detection on a to-be-detected channel, wherein the to-be-detected channel is an unlicensed channel for sending a random access preamble;

increase a preamble transmission counter by one in response to that the result of the LBT detection indicates a failure, and determining a count value of the preamble counter; and perform radio link failure processing in response to that the count value of the preamble transmission counter reaches a maximum number of times for transmitting the preamble, wherein maximum number of times for transmitting the preamble and traffic type of a to-be-transmitted traffic have a correspondence, or service class identifier of a to-be-transmitted traffic have a correspondence.

According to a sixth aspect of the embodiments of the present disclosure, a base station is provided, including:

a processor; and memory for storing processor executable instructions;

wherein the processor is configured to:

determine a first system information block based on a supported traffic type, wherein the first system information block carries at least one of: a correspondence between traffic type and maximum number of times for transmitting a preamble or a correspondence between quality of service class identifier and maximum numbers of times for transmitting a preamble; and broadcast the first system information block.

According to a seventh aspect of the embodiments of the present disclosure, there is provided a non-transitory computer-readable storage medium having computer instructions stored on the storage medium, wherein the computer program is used to execute the method for access control according to the above first aspect.

According to an eighth aspect of the embodiments of the present disclosure, there is provided a non-transitory computer-readable storage medium having computer instructions stored on the storage medium, wherein the computer program is used to execute the method for access control according to the above second aspect.

The technical solutions provided by the examples of the present disclosure can include the following beneficial effects:

When UE supporting NR-U performs random access, the UE is required to perform LBT detection on the unlicensed channel used to send the random access preamble. When the result of the LBT detection is failed, the count value of the preamble transmission counter is increased by one and it is determined whether the count value of the preamble transmission counter has reached the maximum number of times for transmitting the preamble. If the maximum number of times for transmitting the preamble is reached, Radio Link Failure (referred to as RLF) processing can be performed. Here, the maximum number of times for transmitting the preamble is determined based on the traffic type or Quality of Service Class Identifier (referred to as QCI) of the to-be-transmitted traffic, which can realize that UEs supporting NR-U can select the maximum number of times for transmitting the preamble according to different traffic types. For example, for delay-insensitive traffic types, the maximum number of times for transmitting the preamble can be a relatively large value, so that the UE supporting NR-U can perform LBT detection on the channel for more times, which can avoid premature triggering of RLF and random access failure when the unlicensed channel is busy; while for transmitting the preamble for delay-sensitive traffic types, the maximum number of times can be a relatively small value, so that the UE can select other ways to access the network as soon as possible when the unlicensed channel is relatively busy, so as to improve the access success rate and the efficiency of traffic data transmission.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EXAMPLES

Figure 1A:
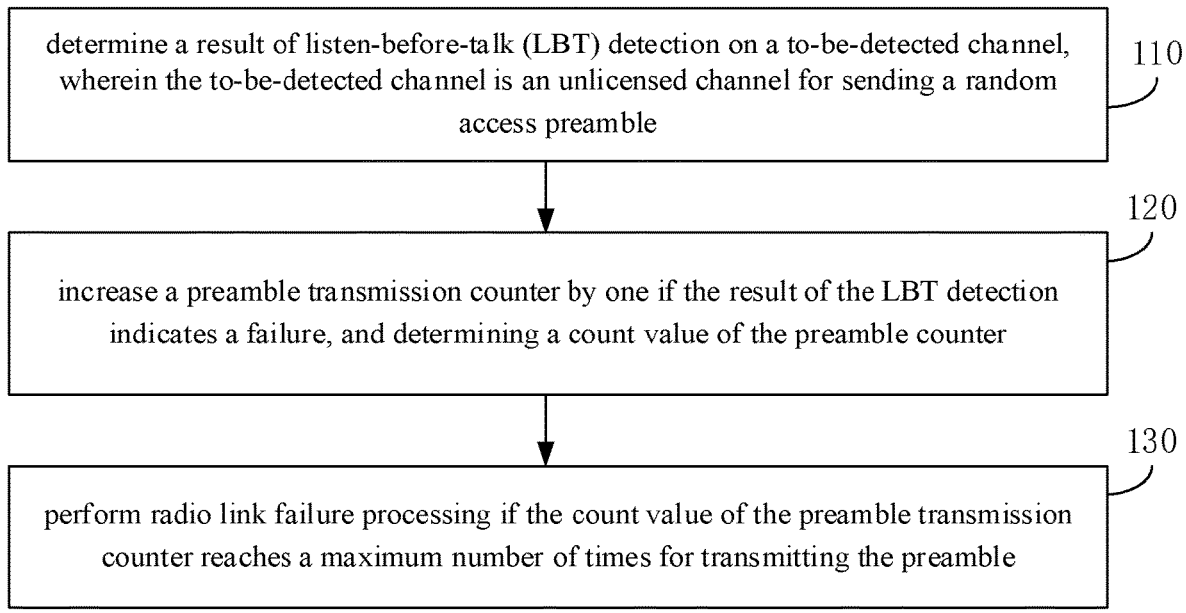
FIG. 1A is a flowchart illustrating a method for access control according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of devices and methods consistent with some aspects of the present disclosure as detailed in the appended claims.

Technical solutions provided by the present disclosure are applicable to a communication system supporting NR-U. In a communication system based on New Radio Access to Unlicensed spectrum, when UE supporting NR-U accesses to the network, the UE is required to first perform channel detection, and perform the random access when the LBT detection is successful.

Figure 1B:
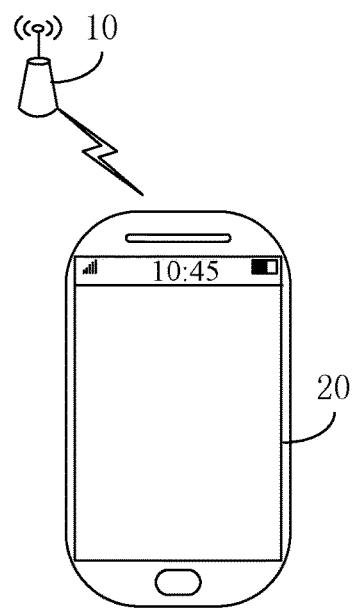
FIG. 1B is a diagram illustrating a scene of a method for access control according to an example.

FIG. 1A is a flowchart illustrating a method for access control according to an example, and FIG. 1B is a diagram illustrating a scene of a method for access control according to an example. The method for access control can be applied to user equipment, as shown in FIG. 1A, the method for access control includes the following steps 110-130.

In step 110, a result of LBT detection on a to-be-detected channel is determined, and the to-be-detected channel is an unlicensed channel for sending a random access preamble.

In an implementation, the result of the LBT detection can usually be obtained by detecting signal energy of the channel. For example, when a value of the signal energy of the to-be-detected channel is lower higher than a preset threshold, it can be determined that the result of the LBT detection indicates a failure; when the value of the signal energy is not lower higher than the preset threshold, it can be determined that the result of the LBT detection of the to-be-detected channel indicates a success. For the implementation of LBT detection on the channel, reference can be made to relevant technical solutions on the LBT detection, which will not be described here.

In step 120, if the result of the LBT detection indicates a failure, a preamble transmission counter is increased by one and a count value of the preamble transmission counter is determined.

In an implementation of the present disclosure, when the random access preamble cannot be sent due to the result of the LBT detection indicating a failure, the count value of the preamble transmission counter is increased at the same time, and when the count value of the preamble transmission counter reaches the maximum number of times for transmitting the preamble, it usually means that the random access process has failed. Therefore, whether the count value of the preamble transmission counter has reached the maximum number of times for transmitting the preamble is determined after the preamble transmission counter is increased by one due to the result of the LBT detection indicating a failure.

In step 130, if the count value of the preamble transmission counter reaches a maximum number of times for transmitting the preamble, radio link failure (RLF) processing is performed.

In an implementation, if the count value of the preamble transmission counter reaches the maximum number of times for transmitting the preamble, a RLF can be triggered and the radio link failure processing can be performed, for example, sending a RLF report to the network side, or trying to connect with other base stations, and so on.

In an implementation, there is a correspondence between maximum number of times for transmitting the preamble and traffic type of a to-be-transmitted traffic, or a correspondence between maximum number of times for transmitting the preamble and Quality of Service Class Identifier (QCI) of a to-be-transmitted traffic.

In an implementation, a maximum value that can be counted by the preamble transmission counter PREAMBLE TRANSMISSION COUNTER is the maximum number of times for transmitting the preamble. In the embodiment of the present disclosure, there is a correspondence between maximum number of times for transmitting the preamble and traffic type or QCI. A traffic type can be indicated as a specific traffic, for example, the traffic type is a video traffic, or the to-be-transmitted traffic is a normal Internet service.

In an implementation, different traffic types have different requirements on bandwidth, speed rate, latency, reliability, etc. For example, when the traffic type is an Ultra Reliable & Low Latency Communication (URLLC) traffic, a network latency requirement is very high, and in order to improve the transmission efficiency of traffic data of the URLLC traffic and avoid excessive delay, the maximum number of times for transmitting the preamble corresponding to the URLLC traffic can be set to a relatively small number. Therefore, the number of times that the UE supporting NR-U can perform LBT detection on the channel will be smaller, so that the UE can choose other ways to access the network as soon as possible when the unlicensed channel is busy, thereby improving the access success rate and the efficiency of traffic data transmission.

In an implementation, different traffics require different QCI for transmission qualities to be assured, and different QCI have different service qualities in terms of bandwidth, speed rate, latency, reliability (data packet loss rate), etc. Therefore, in the technical solutions of the present disclosure, corresponding maximum numbers of times for transmitting the preamble can be set for different QCIs.

In an implementation, a correspondence between traffic type and maximum number of times for transmitting the preamble, or a correspondence between QCI and maximum number of times for transmitting the preamble can be pre-defined by a communication protocol, so that the user equipment can directly obtain at least one of the correspondences based on the provisions of the communication protocol. In the implementation, the user equipment can also obtain at least one of the correspondences through a System Information Block1 (SIB1) broadcast by the base station.

In an exemplary scenario, as shown in FIG. 1B, a mobile network is a 5G network and a base station is an gNB as an example for illustrative description. In the scenario shown in FIG. 1B, NB 10 and UE 20 are provided, where NB 10 and UE 20 both support NR-U. When UE 20 is preparing for random access, UE 20 needs to perform LBT detection on an unlicensed channel used to send a random access preamble, and each time the result of the LBT detection indicates a failure, UE 20 adds one to a preamble transmission counter. When the preamble transmission counter reaches the maximum number of times for transmitting the preamble, UE 20 performs a RLF processing, for example, sending a RLF report to the network side, or trying to connect with other base stations, and so on. Since the maximum number of times for transmitting the preamble is related to the to-be-transmitted traffic of UE 20. Therefore, it can be ensured that UE 20 supporting NR-U selects a maximum number of times for transmitting the preamble according to each traffic type, thereby improving the success rate of random access.

In this embodiment, through the above steps 110-130, when UE supporting NR-U performs random access, the UE is required to perform LBT detection on the unlicensed channel used to send the random access preamble. When the result of the LBT detection indicates a failure, the count value of the preamble transmission counter is increased by one and it is determined whether the count value of the preamble transmission counter has reached the maximum number of times for transmitting the preamble. If the maximum number of times for transmitting the preamble is reached, the RLF processing can be performed. The maximum number of times for transmitting the preamble is determined based on the traffic type or QCI of the to-be-transmitted traffic, which can realize that the UE supporting NR-U can select respective maximum numbers of times for transmitting the preamble according to different traffic types. For example, for latency-insensitive traffic types, a corresponding maximum number of times for transmitting the preamble can be a relatively large value, which can avoid prematurely reaching the maximum number of times for transmitting the preamble and causing a random access failure when the unlicensed channel is relatively busy; and for latency-sensitive traffic types, a corresponding maximum number of times for transmitting the preamble can be a relatively small value, so that the UE can select other ways to access the network as soon as possible when the unlicensed channel is relatively busy, so as to improve the access success rate and the efficiency of traffic data transmission.

The technical solutions provided by the embodiment of the present disclosure will be illustrated with reference to specific implementations below.

Figure 2:
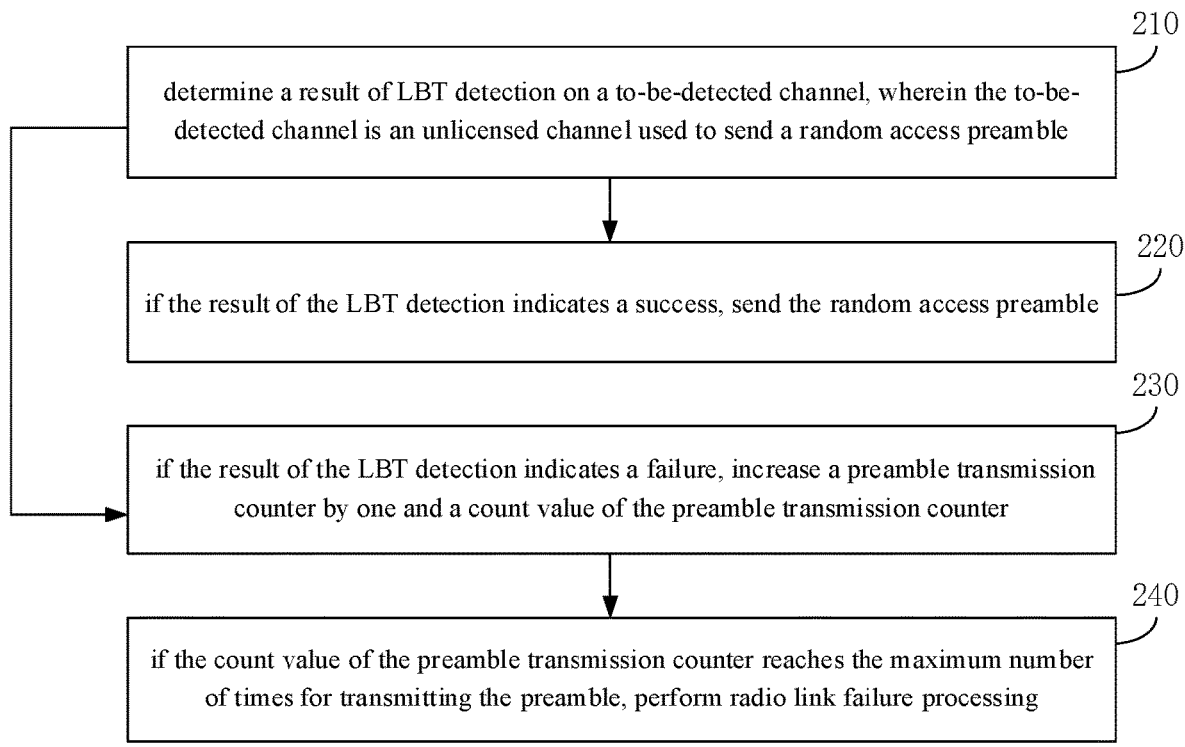
FIG. 2 is a flowchart illustrating another method for access control according to an example.

FIG. 2 is a flowchart illustrating another method for access control according to an example. In this implementation, with the above-mentioned method provided by the embodiment of the present disclosure, how user equipment performs NR-based access to an unlicensed spectrum according to a traffic type or QCI of to-be-transmitted traffic will be illustrated as an example. As shown in FIG. 2, the method includes the following steps.

In step 210, a result of LBT detection on a to-be-detected channel is determined, and the to-be-detected channel is an unlicensed channel for sending a random access preamble, and step 220 and step 230 are performed.

In step 220, if the result of the LBT detection indicates a success, the random access preamble is sent.

In an example, when it is determined that the result of the LBT detection indicates a success, the user equipment sends MSG1 carrying the random access preamble via the to-be-detected channel, so as to complete the random access.

In step 230, if the result of the LBT detection indicates a failure, a preamble transmission counter is increased by one and a count value of the preamble transmission counter is determined.

In an example, when the random access preamble cannot be sent due to the result of the LBT detection indicating a failure, the count value of the preamble transmission counter is increased at the same time, and when the count value of the preamble transmission counter reaches the maximum number of times for transmitting the preamble, it usually means that the random access process has failed. Therefore, it should be determined whether the count value of the preamble transmission counter has reached the maximum number of times for transmitting the preamble after the preamble transmission counter is increased by one due to the result of the LBT detection indicating a failure.

In step 240, if the count value of the preamble transmission counter reaches the maximum number of times for transmitting the preamble, radio link failure processing is performed.

In an implementation, a specific operation of performing the RLF processing can refer to an operation of triggering RLF in related technologies, such as sending an RLF report to the network side, or trying to access other base stations.

In an implementation, there is a correspondence between maximum number of times for transmitting the preamble and traffic type of the to-be-transmitted traffic, or a correspondence between maximum number of times for transmitting the preamble and QCI of the to-be-transmitted traffic.

In an implementation, the user equipment can obtain the correspondence between maximum number of times for transmitting the preamble and traffic type of the to-be-transmitted traffic or the correspondence between maximum number of times for transmitting the preamble and QCI of the to-be-transmitted traffic in two approaches.

Approach 1: the correspondence between maximum number of times for transmitting the preamble and traffic type of the to-be-transmitted traffic or the correspondence between maximum number of times for transmitting the preamble and QCI of the to-be-transmitted traffic is determined according to the provisions of the communication protocol.

Approach 2: the correspondence between maximum number of times for transmitting the preamble and traffic type of the to-be-transmitted traffic or the correspondence between maximum number of times for transmitting the preamble and QCI of the to-be-transmitted traffic is obtained according to dynamic configuration from the base station.

In an implementation, since the traffic types supported by different base stations can be different, a base station can dynamically configure the above-mentioned correspondence according to the traffic types supported by the base station. For example, base station 1 only supports traffic 1, then a maximum number of times for transmitting the preamble associated with traffic 1 can be broadcast through SIB1, while base station 2 supports traffic 1 and traffic 2, and maximum numbers of times for transmitting the preamble respectively corresponding to traffic 1 and traffic 2 can be broadcast through SIB1. The correspondence broadcast by the base station may be pre-defined through a communication protocol.

In this implementation, when the user equipment performs random access, after determining that the result of the LBT detection of the to-be-detected channel indicates a failure, the preamble transmission counter is increased by one, and then when the count value of the preamble transmission counter associated with the to-be-detected channel exceeds the maximum number of times for transmitting the preamble that the preamble transmission counter can count, the RLF is triggered. Since the UE can select respective maximum numbers of times for transmitting the preamble according to different types of traffic, the success rate of random access can be improved.

Figure 3:
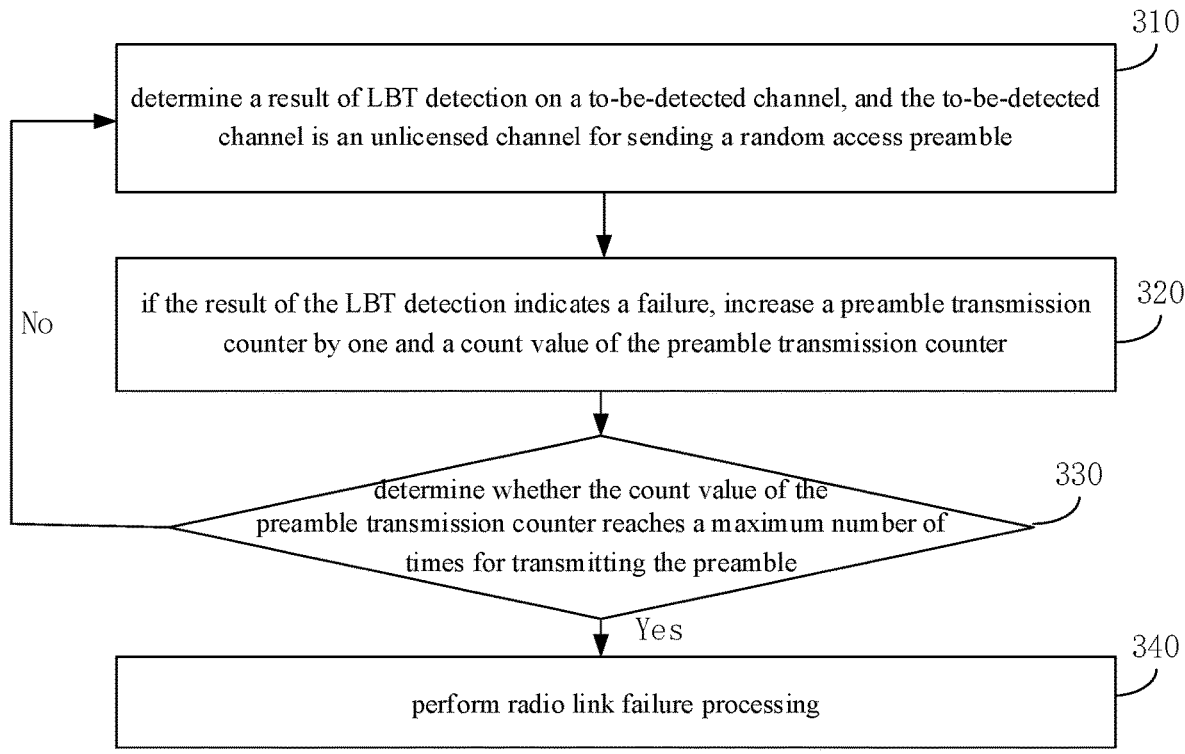
FIG. 3 is a flowchart illustrating another method for access control according to an example.

FIG. 3 is a flowchart illustrating another method for access control according to an example. In this implementation, with the above-mentioned method provided by the embodiment of the present disclosure, how user equipment performs NR-based access to an unlicensed spectrum will be illustrated as an example. As shown in FIG. 3, the method includes the following steps.

In step 310, a result of LBT detection on a to-be-detected channel is determined, and the to-be-detected channel is an unlicensed channel for sending a random access preamble.

In step 320, if the result of the LBT detection indicates a failure, a preamble transmission counter is increased by one and a count value of the preamble transmission counter is determined.

In step 330, it is determined whether the count value of the preamble transmission counter reaches a maximum number of times for transmitting the preamble. If the maximum number of times for transmitting the preamble is reached, step 340 is performed, and if the maximum number of times for transmitting the preamble is not reached, step 310 is performed.

In step 340, radio link failure processing is performed.

In an implementation, if the count value of the preamble transmission counter counted by the UE has reached the maximum number of times for transmitting the preamble, the RLF can be triggered and the radio link failure processing can be performed, for example, sending an RLF report to a base station, or trying to access other base stations, and so on.

In an implementation, if the count value of the preamble transmission counter does not reach the maximum number of times for transmitting the preamble, then continue to perform LBT detection on the to-be-detected channel.

In an implementation, there is a corresponding relationship between the maximum numbers of times for transmitting the preamble and traffic types or QCIs of to-be-transmitted traffic.

In an implementation, a traffic type can also be a specific type of a to-be-transmitted traffic of the user equipment, for example, a to-be-transmitted traffic is a video traffic, or a to-be-transmitted traffic is a normal Internet service, and so on. A QCI of each type of traffic can be specified by a communication protocol.

In this implementation, the user equipment can select a maximum number of times for transmitting the preamble based on the traffic type of the to-be-transmitted traffic, so as to improve the access success rate of the user equipment supporting NR-U to perform random access when the competition for unlicensed frequency band resources is fierce. In this way, in a case that the unlicensed channel is relatively busy, the UE can select other ways to access the network as soon as possible when the traffic type of the to-be-transmitted traffic is a latency-sensitive traffic, or the UE can be prevented from reaching the maximum number of times for transmitting the preamble prematurely and causing random access failure prematurely when the traffic type of the to-be-transmitted traffic is latency-insensitive traffic.

Figure 4:
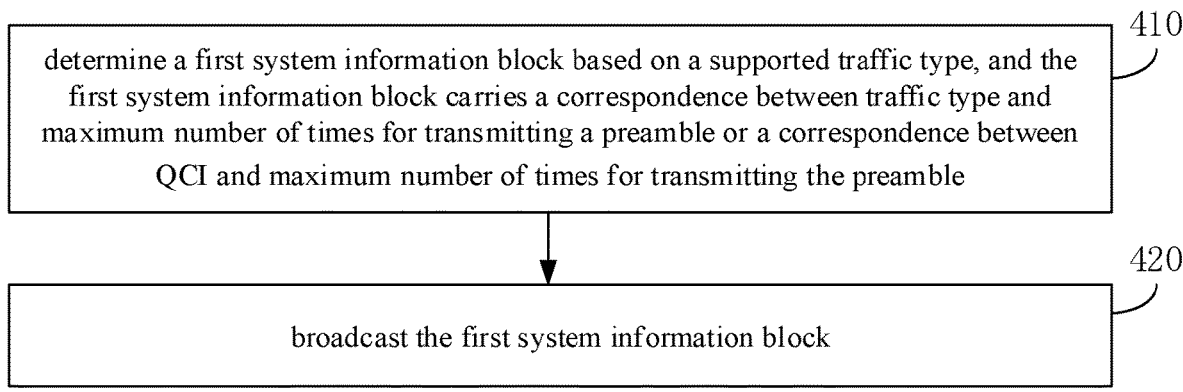
FIG. 4 is a flowchart illustrating a method for access control according to an example.

FIG. 4 is a flowchart illustrating a method for access control according to an example. The method for access control can be applied to a base station supporting new radio access to an unlicensed spectrum. This implementation will be illustrated with reference to FIG. 1B. As shown in FIG. 4, the method for access control includes the following steps 410-420.

In step 410, a first system information block is determined based on a supported traffic type, and the first system information block carries a correspondence between traffic type and maximum number of times for transmitting a preamble or a correspondence between QCI and maximum number of times for transmitting the preamble.

In an example, since the traffic types supported by different base stations can be different, a base station can dynamically configure the above-mentioned correspondence according to the traffic types supported by the base station. For example, base station 1 only supports traffic 1, then a maximum number of times for transmitting the preamble associated with traffic 1 can be carried in SIB1, while base station 2 supports traffic 1 and traffic 2, and maximum numbers of times for transmitting the preamble respectively corresponding to traffic 1 and traffic 2 can be carried in SIB1. In another example, the base station can also directly carry QCI(s) of the supported traffic and corresponding maximum number(s) of times for transmitting the preamble in the SIB1 based on one or more QCIs corresponding to the supported traffic type.

In step 420, the first system information block is broadcast.

In an exemplary scenario, as shown in FIG. 1B, a mobile network is a 5G network and a base station is gNB as an example. In the scenario shown in FIG. 1B, including NB 10 and UE 20 both supporting NR-U, NB 10 can broadcast the correspondence between traffic type of the supported traffic and maximum transmission number of times for transmitting the preamble or the correspondence between QCI and maximum number of times for transmitting the preamble through SIB 1. Therefore, when UE 20 preparing to access NB 10 for random access, UE 20 can select a maximum number of times for transmitting the preamble based on the traffic type of the to-be-transmitted traffic, thereby increasing the success rate of random access.

In this implementation, through the above step 410-420, the base station can broadcast one or more maximum number of times for transmitting the preamble corresponding to the supported traffic type through SIB1, so as to dynamically configure one or more maximum numbers of times for transmitting the preamble corresponding to one or more traffic types or QCIs to the UE, which helps to improve the success rate of the random access for the UE.

Figure 5:
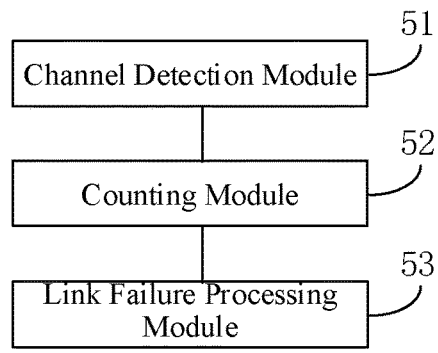
FIG. 5 is a block diagram illustrating a device for access control according to an example.

FIG. 5 is a block diagram illustrating a device for access control according to an example, which is applied to user equipment supporting new radio access to an unlicensed frequency band. As shown in FIG. 5, the device for access control includes:

a channel detection module 51 configured to determine a result of LBT detection on a to-be-detected channel, where the to-be-detected channel is an unlicensed channel used to send a random access preamble;

a counting module 52 configured to increase a preamble transmission counter by one when the channel detection module 51 determines that the result of the LBT detection is failed, and determine a count value of the preamble counter;

a link failure processing module 53 configured to perform radio link failure processing when the counting module 52 determines that the count value of the preamble transmission counter reaches a maximum number of times for transmitting a preamble, where there is a corresponding relationship between maximum numbers of times for transmitting the preamble and traffic types or Quality of Service Class Identifiers of to-be-transmitted traffic.

Figure 6:
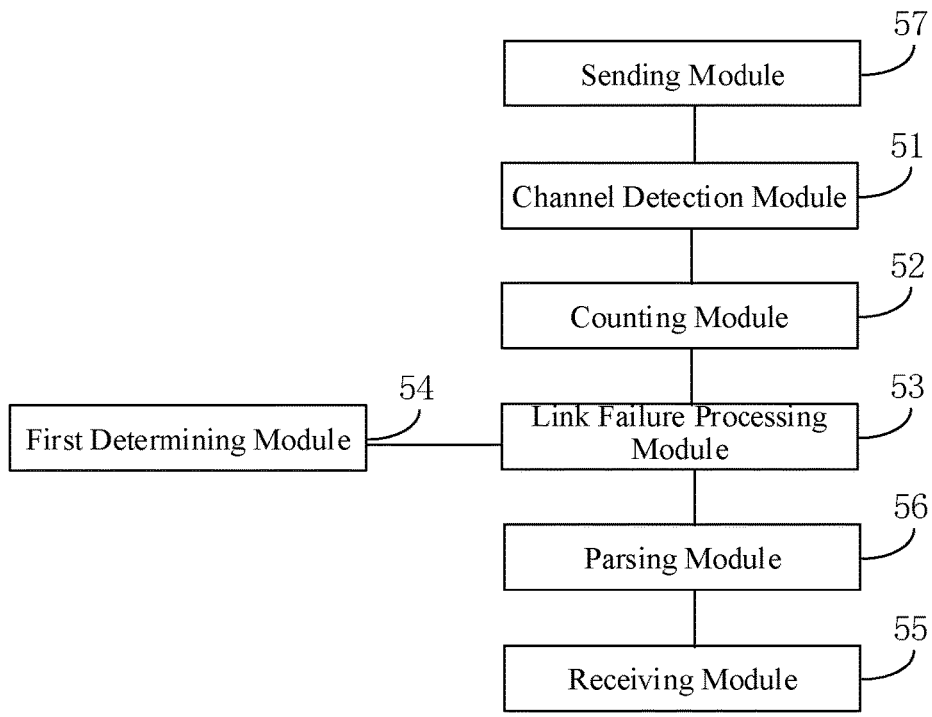
FIG. 6 is a block diagram illustrating another device for access control according to an example.

FIG. 6 is a block diagram illustrating another device for access control according to an example. As shown in FIG. 6, on the basis of the above-mentioned implementation shown in FIG. 5, in an implementation, the device further include:

a first determining module 54 configured to determine the corresponding relationship between maximum numbers of times for transmitting the preamble and traffic types of to-be-transmitted traffic based on provisions of a communication protocol; or, determine the corresponding relationship between maximum numbers of times for transmitting the preamble and Quality of Service Class Identifiers of to-be-transmitted traffic based on provisions of a communication protocol.

Optionally, the device further includes:

a receiving module 55 configured to receive a first system information block sent by a base station;

a parsing module 56 configured to parse the corresponding relationship between maximum numbers of times for transmitting the preamble and traffic types of to-be-transmitted traffic from the first system information block received by the receiving module 55.

Optionally, the channel detection module 51 is further configured to perform an operation of determining the result of LBT detection on the to-be-detected channel when the count value of the preamble transmission counter does not reach the maximum number of times for transmitting the preamble.

Optionally, the device further includes:

a sending module 57 configured to send the random access preamble to the base station when the channel detection module 51 determines that the result of the LBT detection is successful.

Figure 7:
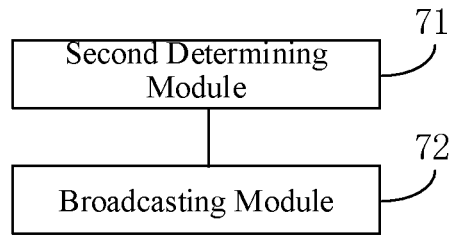
FIG. 7 is a block diagram illustrating a device for access control according to an example.

FIG. 7 is a block diagram illustrating a device for access control according to an example, which is applied to user equipment supporting new radio access to an unlicensed frequency band. As shown in FIG. 7, the device for access control includes:

a second determining module 71 configured to determine a first system information block based on a supported traffic type, where the first system information block carries a corresponding relationship between traffic types and maximum numbers of times for transmitting a preamble or a corresponding relationship between service quality level identifiers and maximum numbers of times for transmitting the preamble;

a broadcasting module 72 configured to broadcast the first system information block determined by the second determining module 71.

Since the device embodiment substantially corresponds to the method embodiment, reference may be made to part of the descriptions of the method embodiment for the related part. The device embodiment described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

The present disclosure also provides a non-transitory computer-readable storage medium on which a computer program is stored, and the computer program is used to execute any one of the method for access controls in FIGS. 1A to 3 above.

The present disclosure also provides a non-transitory computer-readable storage medium, on which a computer program is stored, and the computer program is used to execute the above-mentioned method for access control in FIG. 4.

The present disclosure also provides user equipment, including:

a processor;

memory storing instructions executable by the processor;

where the processor is configured to:

determine a result of LBT detection on a to-be-detected channel, where the to-be-detected channel is an unlicensed channel used to send a random access preamble;

when the result of the LBT detection is failed, increase a preamble transmission counter by one and determine a count value of the preamble counter;

perform radio link failure processing when the count value of the preamble transmission counter reaches a maximum number of times for transmitting a preamble, where there is a corresponding relationship between maximum numbers of times for transmitting the preamble and traffic types or Quality of Service Class Identifiers of to-be-transmitted traffic.

Figure 8:
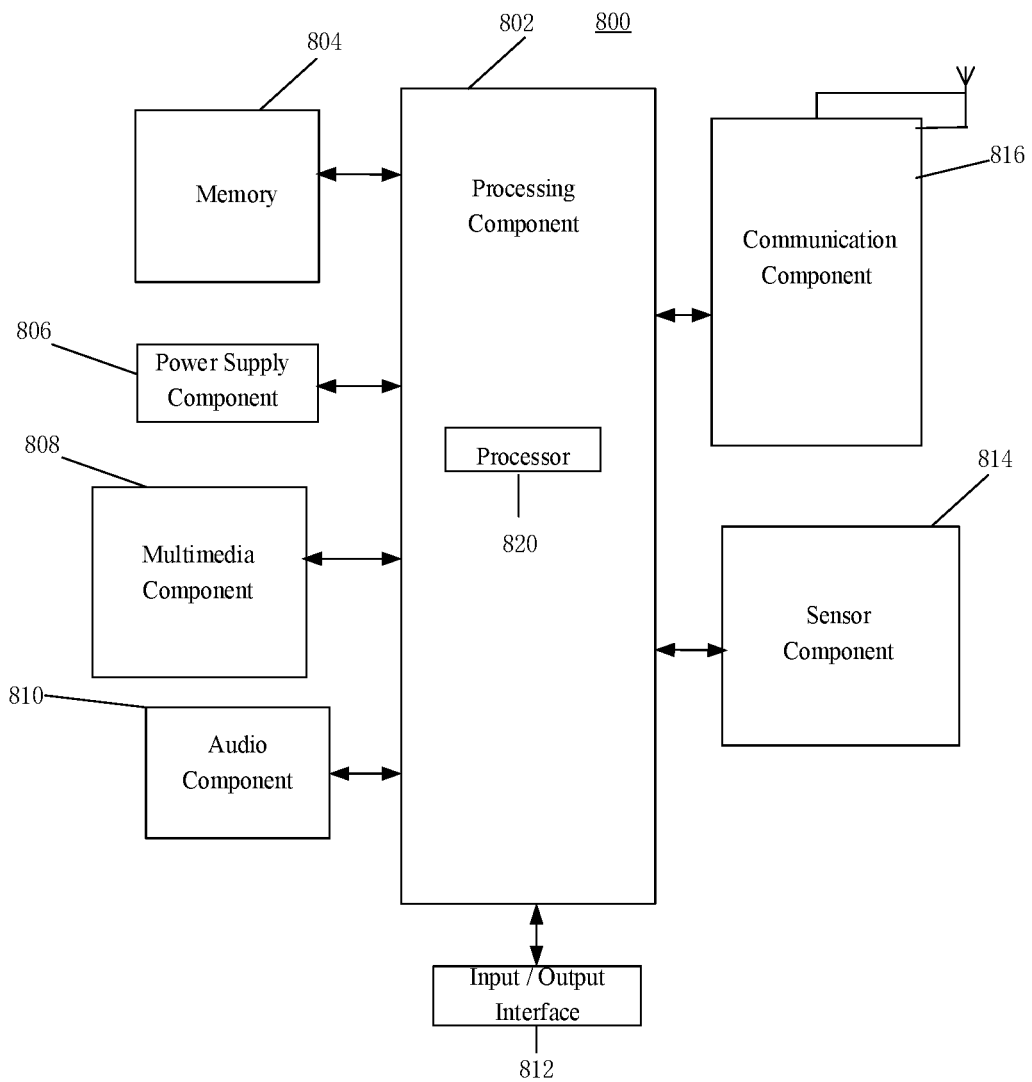
FIG. 8 is a block diagram illustrating a device adaptable for access control according to an example.

FIG. 8 is a block diagram illustrating a structure of a device for control access according to an example. As shown in FIG. 8, a device 800 for control access is shown according to an example. The device 800 can be a terminal, such as a computer, a mobile phone, a digital broadcasting terminal, a messaging device, a game console, a tablet device, a medical device, fitness equipment, a personal digital assistant, or the like.

As shown in FIG. 8, the device 800 can include one or more of the following components: a processing component 801, memory 802, a power supply component 803, a multimedia component 804, an audio component 805, an input/output (I/O) interface 806, a sensor component 807, and a communication component 808.

The processing component 801 generally controls overall operations of the device 800, such as operations associated with display, phone calls, data communications, camera operations, and recording operations. The processing component 801 can include one or more processors 808 to execute instructions to complete all or part of the steps of the above methods. In addition, the processing component 801 can include one or more modules which facilitate the interaction between the processing component 801 and other components. For example, the processing component 801 can include a multimedia module to facilitate the interaction between the multimedia component 804 and the processing component 801.

The memory 802 is to store various types of data to support the operation of the device 800. Examples of such data include instructions for any application or method operated on the device 800, contact data, phonebook data, messages, pictures, videos, and so on. The memory 802 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 803 supplies power for different components of the device 800. The power supply component 803 can include a power supply management system, one or more power supplies, and other components associated with generating, managing and distributing power for the device 800.

The multimedia component 804 includes a screen providing an output interface between the device 800 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 804 can include a front camera and/or a rear camera. The front camera and/or rear camera can receive external multimedia data when the device 800 is in an operating mode, such as a photographing mode or a video mode. Each of the front camera and the rear camera can be a fixed optical lens system or have focal length and optical zooming capability.

The audio component 805 is to output and/or input an audio signal. For example, the audio component 805 includes a microphone (MIC). When the device 800 is in an operating mode, such as a call mode, a record mode and a voice recognition mode, the microphone is to receive an external audio signal. The received audio signal can be further stored in the memory 802 or sent via the communication component 808. In some examples, the audio component 805 further includes a speaker for outputting an audio signal.

The I/O interface 806 provides an interface between the processing component 801 and a peripheral interface module. The above peripheral interface module can be a keyboard, a click wheel, buttons, or the like. These buttons can include but not limited to, a home button, a volume button, a start button and a lock button.

The sensor component 807 includes one or more sensors to provide status assessments of various aspects for the device 800. For example, the sensor component 807 can detect the on/off status of the device 800, and relative positioning of component, for example, the component is a display and a keypad of the device 800. The sensor component 807 can also detect a change in position of the device 800 or a component of the device 800, a presence or absence of the contact between a user and the device 800, an orientation or an acceleration/deceleration of the device 800, and a change in temperature of the device 800. The sensor component 807 can include a proximity sensor to detect the presence of a nearby object without any physical contact. The sensor component 807 can further include an optical sensor, such as a Complementary Metal-Oxide-Semiconductor (CMOS) or Charged Coupled Device (CCD) image sensor which is used in imaging applications. In some examples, the sensor component 807 can further include an acceleration sensor, a gyroscope sensor, a magnetic sensor, a pressure sensor, or a temperature sensor.

The communication component 808 is to facilitate wired or wireless communication between the device 800 and other devices. The device 800 can access a wireless network based on a communication standard, such as Wi-Fi, 2G, or 3G, or a combination thereof. In an example, the communication component 808 receives a broadcast signal or broadcast related information from an external broadcast management system via a broadcast channel. In an example, the communication component 808 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the device 800 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above method for access control.

In an example, a non-transitory computer readable storage medium including instructions is further provided, such as the memory 802 including instructions. The above instructions can be executed by the processor 808 of the device 800 to complete the above method. For example, the non-transitory computer readable storage medium can be a Read-Only Memory (ROM), a Random Access Memory (RAM), a CD-ROM, a magnetic tape, a floppy disk, an optical data storage device, and so on.

It should be understood that the present disclosure is not limited to the precise structure described above and shown in the drawings, and various modifications and changes can be made without departing from its scope. The scope of the present disclosure is only limited by the appended claims.

Figure 9:
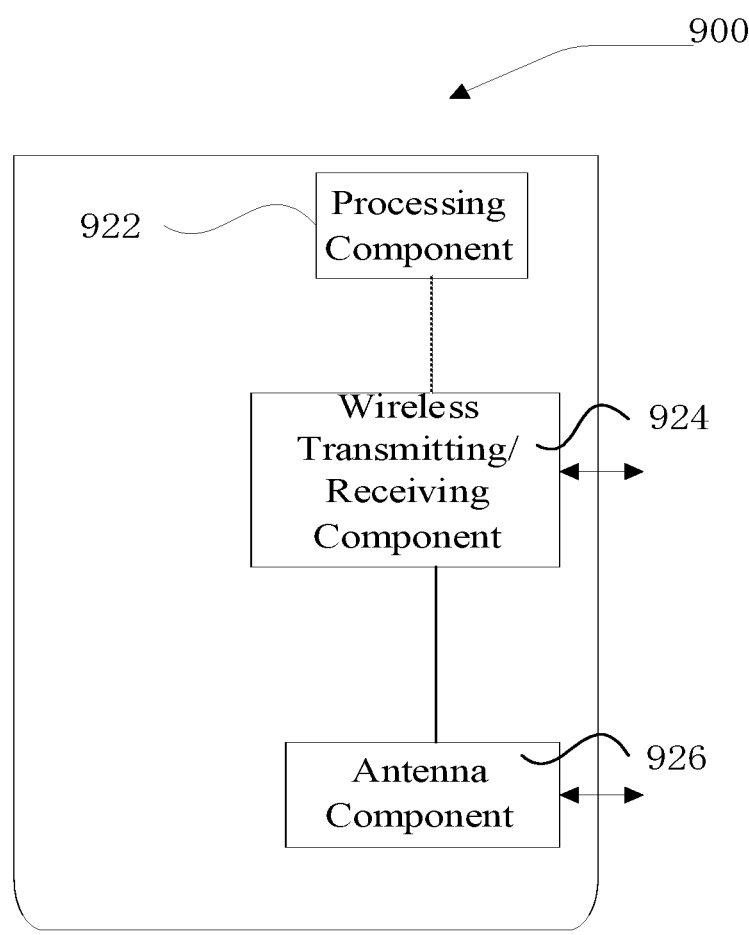
FIG. 9 is a block diagram illustrating a device adaptable for access control according to an example.

As shown in FIG. 9, FIG. 9 is a schematic structural diagram of a device 900 adaptable for access control according to an example. The device 900 can be provided as a base station. Referring to FIG. 9, the device 900 includes a processing component 922, a wireless transmitting/receiving component 924, an antenna component 926, and a signal processing section specific to a wireless interface. The processing component 922 can further include one or more processors.

One of the processors in the processing component 922 can be configured to:

determine a first system information block based on a supported traffic type, where the first system information block carries a corresponding relationship between traffic types and maximum numbers of times for transmitting a preamble or a corresponding relationship between service quality level identifiers and maximum numbers of times for transmitting the preamble;

broadcast the first system information block.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method of access control, being applied to user equipment supporting new radio access to an unlicensed spectrum, comprising:
  determining a result of listen-before-talk (LBT) detection on a to-be-detected channel, wherein the to-be-detected channel is an unlicensed channel for sending a random access preamble;
  increasing a preamble transmission counter by one in response to that the result of the LBT detection indicates a failure, and determining a count value of the preamble counter; and
  performing radio link failure processing in response to that the count value of the preamble transmission counter reaches a maximum number of times for transmitting the preamble, wherein maximum number of times for transmitting the preamble and traffic type of a to-be-transmitted traffic have a correspondence, or service class identifier of a to-be-transmitted traffic have a correspondence;
  wherein the maximum number of times for transmitting the preamble is larger for delay-insensitive traffic types than for delay-sensitive traffic types, such that the user equipment is capable of performing LBT detection on the unlicensed channel for more times, and avoiding prematurely reaching the maximum number of times for transmitting the preamble and random access failure when the unlicensed channel is busy, and selecting other ways to access a network for the delay-sensitive traffic types, thereby improving access success rate and efficiency of traffic data transmission.

2. The method of claim 1, further comprising:
  determining the correspondence between maximum number of times for transmitting the preamble and traffic type of the to-be-transmitted traffic based on a provision of a communication protocol.

3. The method of claim 1, further comprising:
  receiving a first system information block sent by a base station; and
  analyzing the correspondence between maximum number of times for transmitting the preamble and traffic type of the to-be-transmitted traffic from the first system information block, or analyzing the correspondence between maximum number of times for transmitting the preamble and quality of service class identifier of the to-be-transmitted traffic from the first system information block.

4. The method of claim 1, further comprising:
  performing the determining the result of LBT detection on the to-be-detected channel in response to that the count value of the preamble transmission counter does not reach the maximum number of times for transmitting the preamble.

5. The method of claim 1, further comprising:
  in response to that the result of the LBT detection indicates a success, sending the random access preamble to a base station.

6. A non-transitory computer-readable storage medium having computer instructions stored thereon for execution by a processing circuit to implement the method for access control according to claim 1.

7. The method of claim 1, further comprising determining the correspondence between maximum number of times for transmitting the preamble and quality of service class identifier of the to-be-transmitted traffic based on the provision of the communication protocol.

8. A communication system implementing the method of claim 1, comprising the user equipment, wherein:
  when the maximum number of times for transmitting the preamble is reached, the user equipment is configured to perform Radio Link Failure (RLF) processing.

9. The communication system of claim 8, wherein the user equipment is further configured to select the maximum number of times for transmitting the preamble according to different traffic types.

10. The communication system of claim 9, further comprising a base station configured to:
  determine a first system information block based on a supported traffic type, wherein the first system information block carries at least one of: a correspondence between traffic type and maximum number of times for transmitting a preamble or a correspondence between quality of service class identifier and maximum numbers of times for transmitting a preamble; and
  broadcast the first system information block.

11. A method of access control, being applied to a base station supporting new radio access to an unlicensed spectrum, comprising:
  determining a first system information block based on a supported traffic type, wherein the first system information block carries at least one of: a correspondence between traffic type and maximum number of times for transmitting a preamble or a correspondence between quality of service class identifier and maximum numbers of times for transmitting a preamble; and
  broadcasting the first system information block;
  wherein the maximum number of times for transmitting the preamble is larger for delay-insensitive traffic types than for delay-sensitive traffic types, such that the user equipment is capable of performing LBT detection on the unlicensed channel for more times, and avoiding prematurely reaching the maximum number of times for transmitting the preamble and random access failure when the unlicensed channel is busy, and selecting other ways to access a network for the delay-sensitive traffic types, thereby improving access success rate and efficiency of traffic data transmission.

12. A base station implementing the method of claim 11, comprising:
  a processor; and
  memory for storing processor executable instructions;
  wherein the processor is configured to;
  execute the instructions to implement steps of the method.

13. A non-transitory computer-readable storage medium having computer instructions stored thereon for execution by a processing circuit to implement the method for access control according to claim 11.

14. User equipment, comprising:
  a processor; and
  memory for storing processor executable instructions;
  wherein the processor is configured to:
  determine a result of listen-before-talk (LBT) detection on a to-be-detected channel, wherein the to-be-detected channel is an unlicensed channel for sending a random access preamble;
  increase a preamble transmission counter by one in response to that the result of the LBT detection indicates a failure, and determining a count value of the preamble counter; and
  perform radio link failure processing in response to that the count value of the preamble transmission counter reaches a maximum number of times for transmitting the preamble, wherein maximum number of times for transmitting the preamble and traffic type of a to-be-transmitted traffic have a correspondence, or service class identifier of a to-be-transmitted traffic have a correspondence;

wherein the maximum number of times for transmitting the preamble is larger for delay-insensitive traffic types than for delay-sensitive traffic types, such that the user equipment is capable of performing LBT detection on the unlicensed channel for more times, and avoiding prematurely reaching the maximum number of times for transmitting the preamble and random access failure when the unlicensed channel is busy, and selecting other ways to access a network for the delay-sensitive traffic types, thereby improving access success rate and efficiency of traffic data transmission.

15. The user equipment of claim 14, wherein the processor is further configured to:

determine the correspondence between maximum number of time for transmitting the preamble and traffic type of the to-be-transmitted traffic based on a provision of a communication protocol.

16. The user equipment of claim 14, wherein the processor is further configured to:

determine the correspondence between maximum number of times for transmitting the preamble and quality of service class identifier of the to-be-transmitted traffic based on the provision of the communication protocol.

17. The user equipment of claim 14, wherein the processor is further configured to:

receive a first system information block sent by a base station; and analyze the correspondence between maximum number of times for transmitting the preamble and traffic type of the to-be-transmitted traffic from the first system information block, or analyze the correspondence between maximum number of times for transmitting the preamble and quality of service class identifier of the to-be-transmitted traffic from the first system information block.

18. The user equipment of claim 14, wherein the processor is further configured to:

perform the determining the result of LBT detection on the to-be-detected channel in response to that the count value of the preamble transmission counter does not reach the maximum number of times for transmitting the preamble.

19. The user equipment of claim 14, wherein the processor is further configured to:

in response to that the result of the LBT detection indicates a success, send the random access preamble to a base station.

* * * * *